United States Patent
De Carlo et al.

(10) Patent No.: US 9,516,394 B2
(45) Date of Patent: Dec. 6, 2016

(54) METHODS FOR MONITORING AND CONTROL OF ELECTRONIC DEVICES

(75) Inventors: Phil De Carlo, Phoenix, AZ (US); Scott L. Ferguson, Chandler, AZ (US); Paul Reeder, Tempe, AZ (US)

(73) Assignee: Inilex, Inc., Tempe, AZ (US)

( * ) Notice: Subject to any disclaimer, the term of this patent is extended or adjusted under 35 U.S.C. 154(b) by 1279 days.

(21) Appl. No.: 12/505,325

(22) Filed: Jul. 17, 2009

(65) Prior Publication Data

US 2011/0016514 A1 Jan. 20, 2011

(51) Int. Cl.
*G06F 7/04* (2006.01)
*H04Q 9/00* (2006.01)
*H04W 4/00* (2009.01)

(52) U.S. Cl.
CPC .............. *H04Q 9/00* (2013.01); *H04W 4/005* (2013.01); *H04Q 2209/30* (2013.01); *H04Q 2209/40* (2013.01)

(58) Field of Classification Search
CPC ...... G06F 21/6218; H04L 29/06; H04L 63/08; H04L 63/0428; H04L 63/20; H04W 4/005
USPC .................. 726/4, 5, 168; 380/270; 709/230
See application file for complete search history.

(56) References Cited

U.S. PATENT DOCUMENTS

| | | | |
|---|---|---|---|
| 6,930,960 B2* | 8/2005 | Miyake .......................... | 368/113 |
| 7,058,711 B2* | 6/2006 | Fitzgerald ..................... | 709/224 |
| 7,209,490 B2 | 4/2007 | Isaac et al. | |
| 7,336,613 B2* | 2/2008 | Lloyd et al. .................. | 370/237 |
| 7,477,950 B2* | 1/2009 | DeBourke et al. ............. | 700/19 |
| 7,840,700 B2* | 11/2010 | Raghavan et al. ............. | 709/238 |
| 7,865,568 B1* | 1/2011 | Redi ............................. | 709/217 |
| 2002/0091815 A1* | 7/2002 | Anderson et al. ............. | 709/223 |
| 2002/0156839 A1 | 10/2002 | Peterson et al. | |
| 2002/0198990 A1 | 12/2002 | Bradfield et al. | |
| 2003/0046436 A1 | 3/2003 | Govindaraj et al. | |
| 2003/0208609 A1 | 11/2003 | Brusca | |
| 2004/0015579 A1 | 1/2004 | Cooper et al. | |
| 2004/0059815 A1 | 3/2004 | Buckingham et al. | |
| 2004/0123149 A1 | 6/2004 | Tyroler | |
| 2005/0157856 A1* | 7/2005 | Humphries ................. | 379/88.17 |
| 2007/0088931 A1 | 4/2007 | Osaki et al. | |
| 2008/0032677 A1* | 2/2008 | Catovic et al. ............ | 455/414.1 |
| 2009/0177793 A1* | 7/2009 | Josa et al. ..................... | 709/231 |

* cited by examiner

*Primary Examiner* — Ali Abyaneh
(74) *Attorney, Agent, or Firm* — The Noblitt Group, PLLC

(57) ABSTRACT

The present invention relates to telemetry methods and systems and more particularly, to telemetry network connectivity systems, devices and methods. In accordance with various embodiments, a suite of software components configured to provide machine-to-machine network connectivity includes a configurable device translation server module, a complex message constructor and at least one database. In some embodiments the suite of software components, specifically the complex message constructor, may be configured to authenticate commands between an interface and the device translation server. Additionally, the suite of software components, specifically the complex message constructor, may be configured to manage messages between the interface and the device translation server. Managing messages may include initiating alerts and notifications based on a comparison of programming and substantially synchronous and stored information.

18 Claims, 10 Drawing Sheets

METHODS FOR MONITORING AND CONTROL OF ELECTRONIC DEVICES

BACKGROUND OF THE INVENTION

Field of the Invention

The present invention relates generally to telemetry methods and systems and more particularly, to telemetry network connectivity systems, devices and methods Description of the Related Art Telemetry typically refers to wireless communications, such as a radio system, telephonic, computer network, optical link or by wire. Telemetry (often synonymous with telematics) is a technology that allows the remote measurement and reporting of information of interest to the system designer or operator. Systems that use instructions and data sent to them to operate use the counterpart of telemetry, telecommand. Telematics systems typically combine telecommunications and information processing, and frequently utilize remote devices.

M2M refers to data communications between machines. M2M is most commonly translated as Machine-to-Machine but has sometimes been translated as Man-to-Machine, Machine-to-Man, Machine-to-Mobile and Mobile-to-Machine Like all evolving technologies, its definition continues to evolve, but it generally refers to telemetry or telematics that is accomplished using data networks including, but not limited to, public wireless data networks.

In the past, telemetry systems were the exclusive domain of very large well financed organizations. NASA used telemetry extensively from the very beginning of the space program and which was probably one of the first applications. Large oil and gas companies and electric utilities, through the use of extensive customer built dedicated data networks, were among the first private organizations to use telemetry. M2M can also mean the family of sensors, middleware, software and applications that help improve efficiency and quality by tying together a myriad of sensors with mission critical applications like asset management, enterprise resource planning (ERP), and customer resource management (CRM).

In recent years, the cost of access to public wireless data networks (CDMA, GPRS, Mobitex, etc.) is decreasing while the capability of these networks continues to increase. M2M generally refers to technology that leverages these networks to bring telemetry to a much wider audience. In addition, M2M sometimes refers to similar leveraging of the internet leading to the pervasive internet. The pervasive internet refers to the deployment of web services on devices, smart metering, and new streaming sensor technologies that creates "data torrents and rivers" of such volumes that traditional data warehouses and analytic tools struggle to keep up and manage the information, let alone provide close to real-time analytics, processing, and controls based on that information.

As the scope of M2M has evolved, other terms like Machine to Human (M2H) and Machine to Enterprise (M2E) are starting to emerge to segment the pervasive nature of the M2M term. The M2M device, software, network, and service market is expected to grow rapidly world wide in the near future. There are on the order of a half billion computers in the world and over one and a half billion cell phones & PDAs, it is estimated there are more than 38 billion other electronic devices that have information relevant to improving an enterprises operation. For instance, vehicle containers, tankers, supply chain assets, items with SKU's, medical devices, HVAC, industrial machinery, distributed generation, industrial controllers, appliance controllers, vending machines, vehicle locators, and the like are all candidates for telemetry applications. The M2M market strives to connect these devices to corporations, governments, institutions and individuals.

Initially, if a developer was versed in the inner workings of the device operating system a custom device driver was written for controlling the device operation, however this was time consuming and required intimate knowledge of device operation. The industry moved from custom designs to an application programming interface (API). An API is a set of routines, data structures, object classes and/or protocols provided by libraries and/or operating system services in order to support the building of applications. An API may be language-dependent; that is, available only in a particular programming language, using the particular syntax and elements of the programming language to make the API convenient to use in its particular context. Alternatively, an API may be language-independent; that is, written in a way that means it can be called from several programming languages (typically an assembly/C-level interface). This allows a service-style API that is not bound to a particular process or system and is available as a remote procedure call.

The API itself is largely abstract in that it specifies an interface and controls the behavior of the objects specified in that interface. The software that provides the functionality described by an API is said to be an implementation of the API. An API is typically defined in terms of the programming language used to build an application. The related term, ABI (Application Binary Interface), is a lower level definition concerning details at the Assembly language level. For instance, The POSIX standard defines an API that allows a wide range of common computing functions to be written such that they may operate on many different systems; however, making use of this requires re-compilation for each platform. A compatible ABI, on the other hand, allows compiled object code to function without any changes, on any system implementing that ABI. This is advantageous to both software providers (where they may distribute existing software on new systems without producing/distributing upgrades) and users (where they may install older software on their new systems without purchasing upgrades), although this generally requires various distributed software libraries implementing the necessary APIs. Library versioning, device addressing and message handling across varied networks encumber software designers and end users.

An advantageous process over API solutions is utilizing OLE for Process Control (OPC). The OPC specification was based on the OLE, COM, and DCOM technologies developed by Microsoft for the Microsoft Windows operating system family. This specification defined a standard set of objects, interfaces and methods for use in process control and manufacturing automation applications to facilitate interoperability. OPC was designed to bridge Windows based applications and process control hardware and software applications. The standard defines consistent method of accessing field data from distributed devices. This method remains the same regardless of the type and source of data. OPC servers provide a method for many different software packages to access data from a process control device, such as a PLC or DCS. Traditionally, any time a package needed access to data from a device, a custom interface, or driver, had to be written. The purpose of OPC is to define a common interface that is written once and then reused by any business, SCADA, HMI, or custom software packages. Once an OPC server is written for a particular device, it can be reused by any application that is able to act as an OPC client. OPC servers use Microsoft's OLE technology (also known as the Component Object Model, or COM) to communicate with clients. COM technology permits a standard for real-time information exchange between software applications and process hardware. However, lack of security, lack of scalability, frequent configuration issues with DCOM, lack of configurable time-outs, and that limited to the Windows Operating System were significant drawbacks to OLE for process control.

Dealing with different devices and networks can be a burden to developers, since each device may have a different communication protocol, and different networks have different interface requirements. A need exists for a system which overcomes these and other problems.

SUMMARY OF THE INVENTION

The present invention relates generally to telemetry methods and systems and more particularly, to telemetry network connectivity systems, devices and methods. In accordance with various embodiments, a suite of software components configured to provide machine-to-machine network connectivity includes a configurable device translation server module, a configurable complex message constructor and at least one database. In some embodiments the suite of software components, specifically the complex message constructor, may be configured to authenticate commands between an interface and the device translation server. Additionally, the suite of software components, specifically the complex message constructor, may be configured to manage messages between the interface and the device translation server. Managing messages may include initiating alerts and notifications based on a comparison of programming and substantially synchronous and stored information.

In accordance with various embodiments the suite of software components configured to provide machine-to-machine network connectivity includes a configurable interface, a configurable device translation server module, a device capable of telemetry based communication, a configurable complex message constructor and at least one database. In some embodiments the suite of software components, specifically the complex message constructor, may be configured to authenticate commands between an interface and the device translation server. Additionally, the suite of software components, specifically the complex message constructor, may be configured to manage messages between the interface and the device translation server. Managing messages may include initiating alerts and notifications based on a comparison of programming and substantially synchronous and stored information. According to various embodiments, the suite of software components may also include a global network.

In accordance with various embodiments a method of machine-to-machine communication including (1) authenticating an issued command, (2) discovering a device, (3) reviewing command content and compare with preset programming, (4) querying, storing and retrieving information from a database, (5) translating of device specific protocol to uniform protocol, (6) executing a method synchronously if desired (7) executing a method in simulated synchronously if synchronicity is unavailable, (8) translating to specific protocol to uniform protocol, and (9) sending reply to issued command is disclosed. Information can be sent in either direction. Meaning information may be exchanged from the user to a device or from a device to a user. Also, users may retrieve information from a database or devices may retrieve information from a database.

Additionally, in some embodiments, a suite of software components configured to provide machine-to-machine network connectivity might be further configured to allow a user to set a notification preference and/or an escalating notification preference. In some embodiments, the database may be coupled to the configurable device translation server virtually. Also, in some embodiments, the database may be coupled to the complex message constructor virtually. In some embodiments, a suite of software components configured to provide machine-to-machine network connectivity may comprise an optimization utility configured to provide machine-to-machine network communication based on network optimization factors.

In accordance with various embodiments a method and system of machine-to-machine communication includes multiple unique devices utilizing device specific protocols, device specific networks, and device specific applications. The device specific protocols may include one or more of XML, SOAP over HTTP, WSDL, UDDI, SMTP, binary encoding over TCP, ReFlex, GPRS, EDGE, Mobitex, CDMA, EVDO, VSAT, wired LAN, Wired WAN, message queues via Microsoft Windows MSMQ, and combinations thereof, but these are examples only and are not limiting of device specific protocol options. In accordance with various embodiments, the device specific networks may include one or more of Skytel, USAM, Wyless, Sprint, Private LAN, T-Mobile, AT&T, Private VPN, and Private WAN, and any combinations thereof, in addition to any other desired networks. Additionally, in some embodiments, the suite of software components configured to provide machine-to-machine network connectivity may be passive, initiated by a user, initiated by a device, or be initiated by a preprogrammed condition. In some embodiments, the suite of software components configured to provide machine-to-machine network connectivity may be substantially synchronous, asynchronous or synchronous.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

Embodiments of the present invention will now be described, by way of example only, with reference to the following drawings, in which.

DETAILED DESCRIPTION OF THE PREFERRED EMBODIMENTS

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the reference feature(s).

The present invention relates to telemetry methods and systems and more particularly, to telemetry network connectivity systems, devices and methods. In one embodiment, a suite of software components built on Microsoft's .NET Framework provides telemetry network connectivity irrespective of device type, device specific protocol, device specific network or device location. In one embodiment, the suite of software components is configured to connect a plurality devices running on different networks with different data protocols and provide a common interface for communication and/or web development, to, among other things, insulate the web developer from the need to develop and maintain connections to different wireless networks, and from having to handle multiple data formats. In another embodiment, the suite of software components is configured to connect a plurality devices running on the same network with the same protocols and provide a common interface for communication and/or web development. Additionally, the suite of software components can be configured to provide a common interface for communication between combinations of the same or different networks, protocols and devices. Devices can comprise mobile information appliances, static information appliances, mobile devices, static devices, and those containing: controllers, smart sensors, microprocessors and/or microcontrollers.

Figure 1:
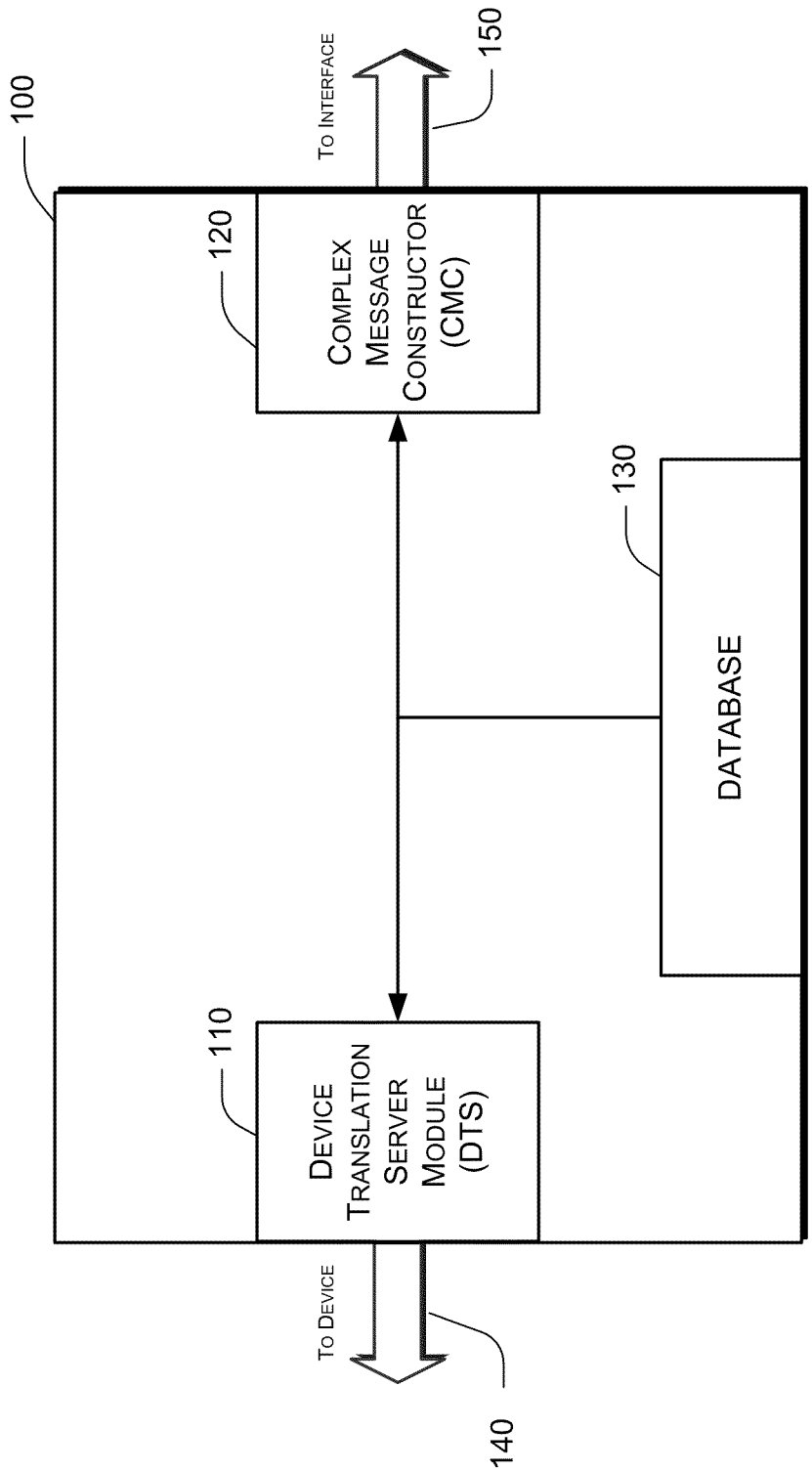
FIG. 1 illustrates an embodiment of a suite of software components configured to provide machine-to-machine network connectivity architecture in accordance with the systems and methods described herein.

Referring to FIG. 1, in accordance with various embodiments, a suite 100 of components configured to provide machine-to-machine network connectivity includes a configurable device translation server module 110, a configurable complex message constructor (CMC) 120 and at least one database 130. As mentioned in more detail below, the device translation server module 110 may be coupled 140 to one or more electronic devices and the complex message constructor 120 may couple 150 to one or more interfaces. Such couplings may be implemented through any appropriate means, whether direct or indirect, virtual, digital, wireless, electronic, networked, or physical.

Figure 2:
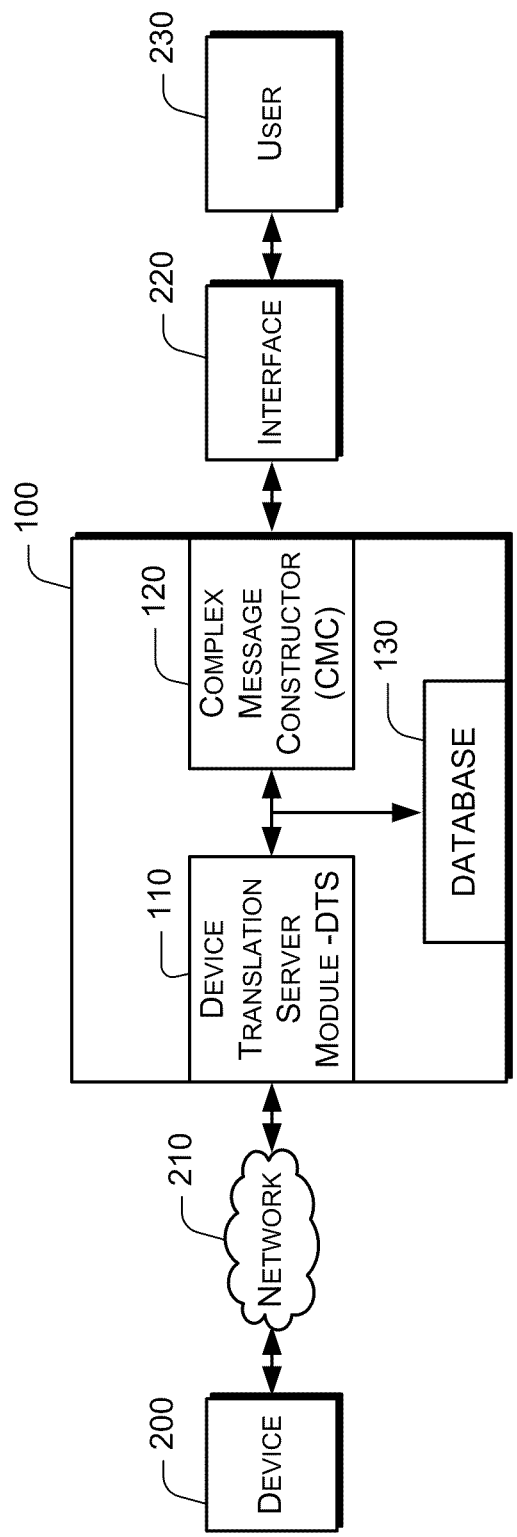
FIG. 2 illustrates another embodiment of a suite of software components configured to provide machine-to-machine network connectivity.
Figure 3:
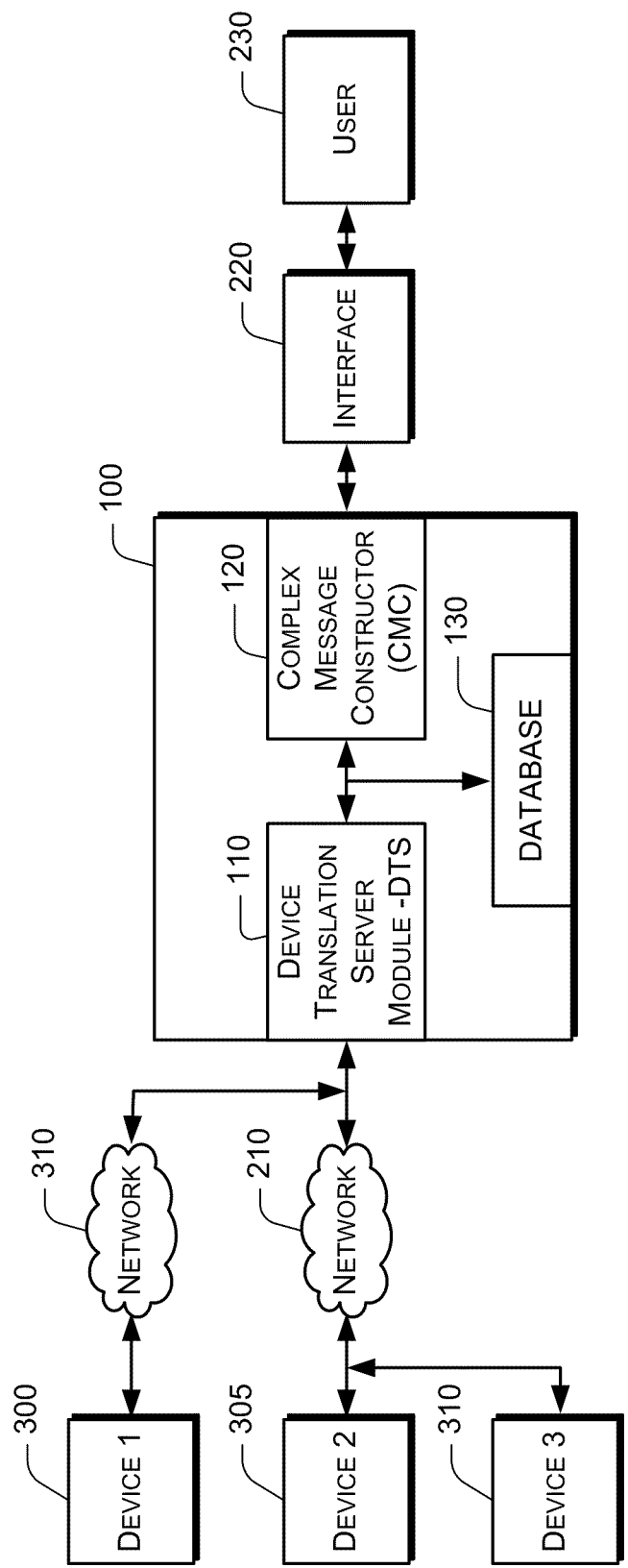
FIG. 3 illustrates an embodiment of a suite of software components configured to provide multiple dissimilar devices machine-to-machine network connectivity over multiple networks.

In one embodiment, referring to FIG. 2, each device 200 is coupled to its own device translation server module (DTS) 110, and in the embodiment shown, the coupling is accomplished through a network 210. In an interface initiated scenario, this DTS connects to the network 210 to communicate with the device, and translates from common interface 220 used by an application such as a World Wide Web- or Internet-based application into the specific protocol needed by the device 200. The interface 220 may represent any desired data input/output mechanism, including but not limited to a web application interface, a dedicated software application interface, a personal digital assistant (PDA) interface, a mobile communication device interface, an interactive voice response system, a DTMF-tone control system, and combinations thereof. In some embodiments, referring to FIG. 3, the configurable device translation server module 110 is configured to run a device instance method and store the device instance method in the database 130 wherein the device instance method includes device specific protocol information, device type and device specific network information. In this manner, a single instance of a DTS may be invoked, or multiple instances of a DTS may be instantiated and available in the database 130. Devices 2 and 3 as shown (305, 310, respectively) may communicate on the same network 210 to the one or more DTS 110 instances, and different or similar other devices 300 may communicate with a DTS 110 through a disparate network connection 310. For instance, one DTS instance 110 could serve a single type of tracking device on an AT&T network, and a separate DTS instance 110 could serve that same type of device on the T-Mobile network. Alternatively, a single DTS instance 110 could communicate with both AT&T and T-Mobile for the given device type. Each device communicates with its DTS instance using the DTS's own proprietary protocol, and the DTS instance translates incoming and outgoing messages into a common protocol (common telemetry interface or CTI) to communicate with the remainder of the system of the present invention. One device (e.g. 300, 305, or 310) may report speed in kilometers per hour, while another type of device reports speed in knots, and another type of device reports speed in miles per hour. Each of these messages would be translated into CTI by their associated DTS instance, and the resulting speed alert transmitted to the client application would be represented in a common format that expresses speed in miles per hour. In another example, one GPS tracking device may report location in a text message using the NMEA protocol, while another may send in a binary message. When these messages are communicated through their respective DTS instances/modules, they are translated into a common format that expressed latitude and longitude in decimal degrees, and altitude in meters. The DTS and CMC may be the located in same or different modules or suites.

Figure 4:
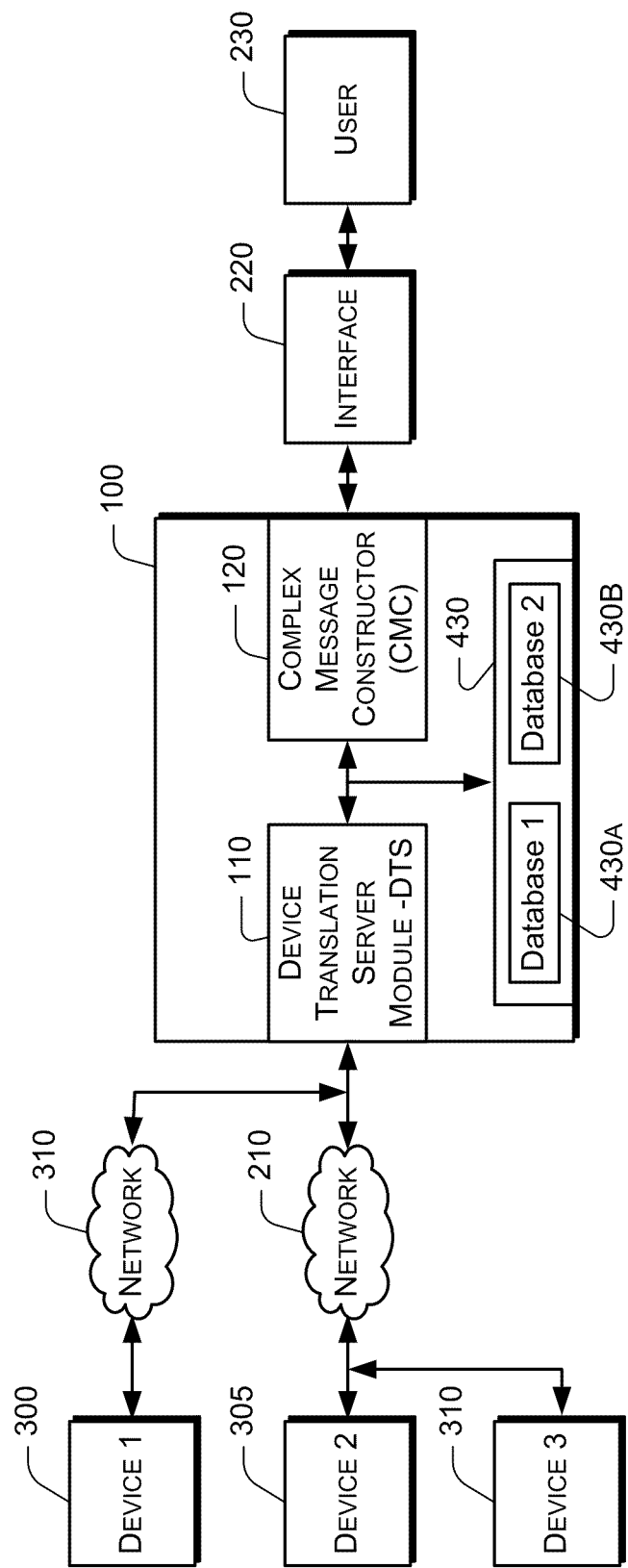
FIG. 4 illustrates an embodiment of a suite of software components configured to provide machine-to-machine network connectivity comprising multiple databases.
Figure 5:
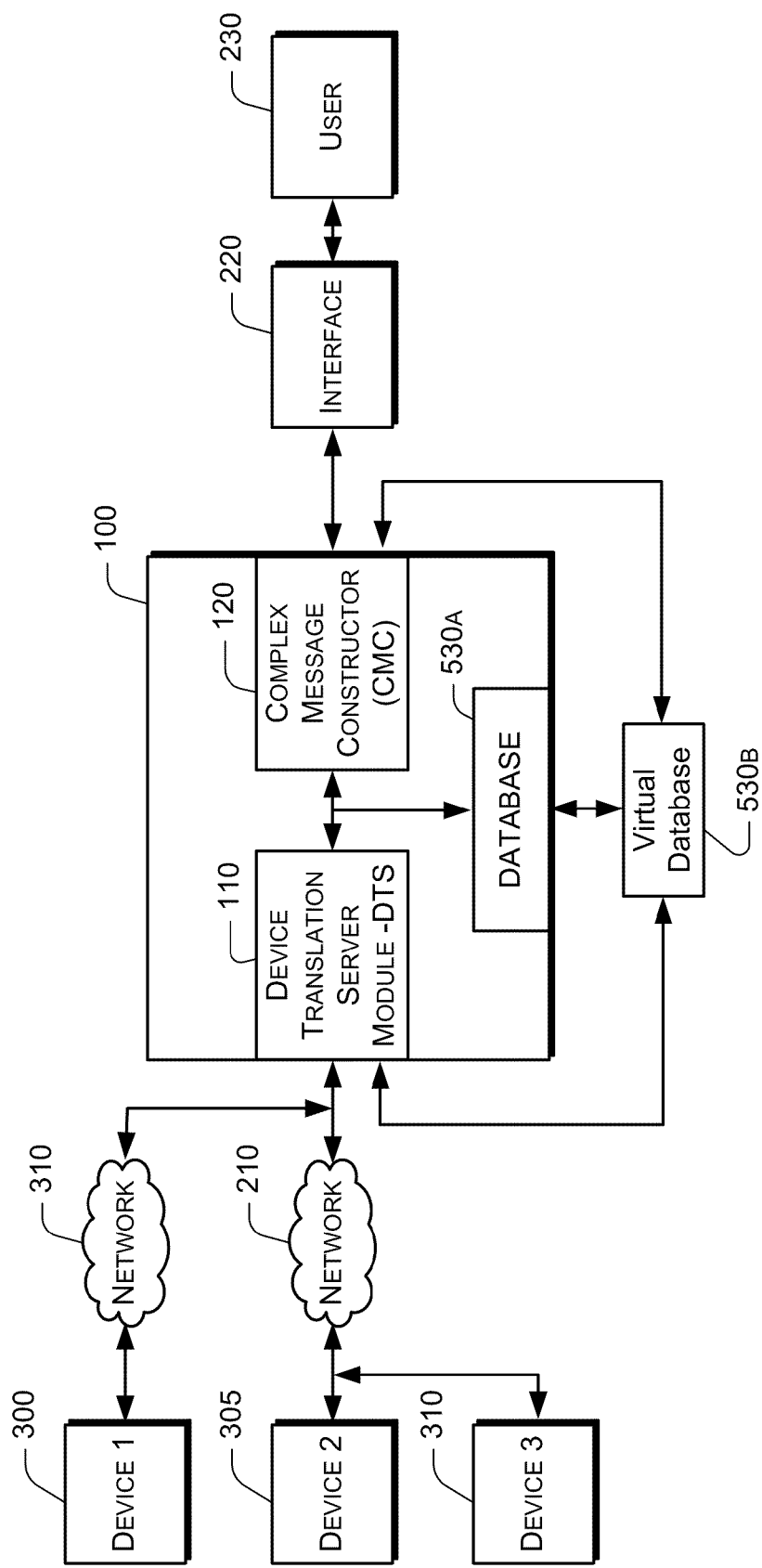
FIG. 5 illustrates another embodiment of a suite of software components configured to provide multiple similar and dissimilar devices machine-to-machine network connectivity over multiple networks comprising a local and at least one virtual database.

The suite of software components 100 system data facility comprises at least one database 130 that tracks device configuration, user credentials and/or messaging activity. As shown in FIGS. 4 and 5, the system data facility may comprise multiple databases 430A, 430B, 530A, 530B (and others not shown) either virtual or physical, collocated with the system data facility (e.g. in database repository 430) or remotely located. Any suitable server may be used, and in one embodiment, the system data facility may be built on Microsoft SQL Server. This provides a robust, industry-standard platform for retention of mission-critical data. In one embodiment, the system data facility may provide and store user credentials, provide and store device configuration, provide and store device specific protocol information, provide and store device specific network information, and/or provide and store device measurement and reporting information.

In some embodiments the suite of components, specifically the CMC, may be configured to authenticate commands between an interface and the device translation server. The interface may comprise a web application interface. This interface may assist users in interacting with the suite of components 100 configured to provide machine-to-machine connectivity, retrieve data, and/or control a particular machine, device, computer program or other complex tool. The interface 220 may comprise an input device, allowing the users to manipulate the suite of components and an output, allowing the system to indicate the effects of the users' manipulation. The interface 220 may comprise a graphical user interface, web-based user interface or web user interface, command line interface, tactile interface, touch interface attentive user interface, batch interface, conversational interface agent, crossing-based interface, device control panel interface, gesture interface, intelligent user interface, multi-screen interface, noncommand user interface, object-oriented user interface (OOUI), reflexive user interface, tangible user interface, text user interface, voice user interface, natural-language interface, zero-input interface, and/or zooming user interface.

The CMC 120 contains modules to process authentication and security, manage databases, and provide alerts and notifications based on device pre-sets or default values. In one embodiment, client web applications will connect to a suite of software components through the CMC. Each web application can use a device discovery function to determine which devices are available and what features those devices support. The device discovery function allocates which devices are available to be queried. Device functionality and access may be different according to various permissions set for unique users of an interface, such as a web interface. For instance, a selection of users or a single user may be able to view device historical use or device current status but not control a device based on preset CMC conditions and/or settings. In one embodiment, the complex message constructor may provide one or more of credential verification, certificate matching, authentication, and/or discovery functions. The CMC may encapsulate data, wrap private data in classes in object-oriented programming languages, provide protocol layering and provide message encryption.

In some embodiments, a suite of software components configured to provide machine-to-machine network connectivity may comprise an optimization utility configured to provide machine-to-machine network communication based on network optimization factors. In some embodiments the network optimization factors further comprise at least one of a determination of network availability, a determination of backup network availability, a determination of expected network data transfer duration, a determination of network data transfer rate and a determination of expected backup network data transfer duration. For instance, the CMC may review the requested instance of a method and select based upon preprogrammed instructions and substantially current and historical data which network to utilize from a plurality of networks for a device connected to a plurality of networks. These preprogrammed instructions and/or historical and/or current data may include which networks are presently available, have historically been available, which network is most economical, or which network comprises the optimal historical or present data transfer rate.

In some embodiments, the suite of software components, specifically the CMC, may be configured to manage messages between the interface and the device translation server. Managing messages may include initiating alerts and notifications based on a comparison of programming and substantially real time information and stored information. For instance, if desired, a database, such as the system data facility, shall store historical device information. In some embodiments the suite of software components data is reported synchronously, substantially simulated synchronously and/or substantially asynchronously. Substantially synchronous communication may comprise each end of an exchange of communication responding in turn without initiating a new communication. A typical activity that might use a synchronous protocol would be a transmission of files from one point to another. As each transmission is received, a response is returned indicating success or the need to resend. Each successive transmission of data generally requires a response to the previous transmission before a new one is initiated. Simulated synchronicity comprises a selection of responses may be returned when a transmission is received. For instance, in a simulated synchronicity environment, if substantially real time data is requested and substantially real time data is currently unavailable substitute historical data may be returned to the request instead of the unavailable substantially real-time data. For instance, if a user of a web application interface requested information relating the inventory in a specific remotely located vending machine but a communication had not recently been received or was currently unavailable from the vending machine, the most recent inventory information would be returned to a user rather than waiting for a substantially synchronous response from the vending machine. Asynchronous operation may comprise a process operating independently of other processes.

In another embodiment the CMC may intercept and re-route called methods based on a review of message content and a comparison of preprogrammed data. Alternatively, the CMC may review message content and issues a notifications based on a comparison of programming and stored device measurement and reporting information and substantially real-time device measurement and reporting information. These notifications may comprise at least one of notifying a user and/or web application of a condition and issuing a preprogrammed command to the device. The programming may comprise at least one of a determination of data trends, a determination of the device status, a determination of the device communication failure, a determination of the device operating in an unauthorized manner, a determination of a reported level deviating from an expected range, and a determination of reported data exceeding a safety condition. For instance, the CMC may review information sent from a thermostat which sends data that the temperature is exceeding a pre-set threshold. The CMC may send a notification to a first user, and/or send a control signal to the HVAC system and/or device to increase and/or begin cooling the affected area. Also, the programming may include preset escalation conditions. For instance, if the measured temperature over time continues to exceed the expected range and a comparison of the current value to previous historical values indicates an increasing temperature trend and additional HAVC system and/or devices may be directed to increase or begin cooling the affected area and in addition to a signal communicated to a first user. An additional warning may be communicated to a second user via the same or a different communication method such as a text or SMS message regarding the warning condition and/or device status.

Dealing with different devices and networks can become a burden to system developers, since each device may have a different communication protocol, and different networks have different interface requirements. One embodiment of the current system suite of software components eliminates complexity by providing a common interface for all devices regardless of protocol or network. The suite of software component's connectivity between client and server supports a myriad of common communication platforms. These communication platforms may comprise any appropriate platform, including but not limited to: XML, SOAP over HTTP, WSDL, UDDI, SMTP, binary encoding over TCP, ReFlex, GPRS, EDGE, Mobitex, CDMA, EVDO, VSAT, wired LAN, Wired WAN, and message queues via Microsoft Windows MSMQ or other appropriate application. Because the suite of software components acts as an intelligent proxy between the client application and the device data network, any existing client interface can be accommodated. As discussed previously, data integrity can be managed via certificate based encryption.

In one embodiment the suite of software components provides a common means of addressing devices that is independent of network addressing. Managing a disparate collection of IP addresses, telephone numbers or other network identifiers is not needed. Each device is identified by a user-selected name. In one embodiment, the application connects to the suite of software components and uses the common name to address the device. The CMC acquires the name in the database, replaces the name with the unique network identifier, and routes the message to the correct DTS instance. This simplifies addressing so that devices can be addressed in a common manner irrespective of what network is utilized. The application that interfaces with users need only know the common name of the device. No special accommodation is needed for compatibility with different networks. All networks are managed by a single connection to the suite of software components. Additionally, changes in devices or networks are insulated from a business application. For instance if a device needs to be moved from one network to another, or replaced, it can keep the same common name. Any changes in addressing are done in the suite of software components.

In another embodiment, the suite of software components provides a robust platform for message handling across any network. Message queues for multiple networks, with different packet sizes, latencies and/or protocols can be processed. The suite of software components handles all necessary message queuing, retries, and notifications. For instance, in one embodiment, devices operating on lower data rate networks such as ReFLEX may experience latencies on the order of 20 to 30 seconds before messages are delivered and confirmed, while devices on 3G networks may see latencies three orders of magnitude lower. In another embodiment, the suite of software components manages the message queues for these different networks. Different networks have different interface methods: For instance, WCTP for ReFLEX networks, VPN for wired and wireless LAN, or private/public APN for cellular networks. The suite of software components manages the different connection protocols and security requirements for these connections, again providing a single point of contact for all networks on which customer devices are being used. Some networks, such as ReFLEX or Mobitex, deliver messages to devices over a period of time. Other networks, such as IP based cellular networks, may rely upon the client application to deliver messages. The device specific networks may comprise any appropriate networks, including but not limited to: Skytel, USAM, Wyless, Sprint, Private LAN, T-Mobile, AT&T, Private VPN, and Private WAN.

The suite of software components insulates a development team/or user from these differences. Many networks implement some form of broadcast messaging, but this feature is limited to devices upon that specific network. The suite of software components of the present invention facilitates broadcast messaging across diverse networks.

In one embodiment, the suite of software components provides automatic configuration of telemetry communication devices. For instance, a device may load its parameters and data from the suite of software components. A user would preset a list of device names and tags into the database and the devices may auto configure based upon information stored in the database. This approach may provide scalability as individual components would not require preloading of data. For instance, a firm could have hundreds of identical or varied devices ready for installation. Once a device is installed it is given an identifier. A user could call the identified DTS instances of one or many of the remotely located identical or different devices through the firm's web interface. The user's instance call or calls, once authenticated by the CMC, will locate the device and/or devices. The device or devices may then download preprogrammed operating parameters from the one or more databases of the present system and operate as desired. Alternatively, a device that is not called until needed such as a stolen car location device, could be activated remotely in a similar manner. The device would download its specific data after activating and respond with appropriate information according to preprogramming. In this case, the appropriate information may comprise device location.

Additionally, historical data can be called from the database by a user. For instance, if a user such as a business owner wished to determine the whereabouts of his location device equipped delivery vehicle over a particular historical period route information such as time between stops, vehicle speed/or variance outside of a preprogrammed boundary could be requested, located and/or returned.

Some embodiments may utilize the .NET Framework which provides a class hierarchy on which programs are built. The .NET Framework provides a layer of abstraction over an operating system, making .NET programs platform independent. The framework's Base Class Library provides a large range of features including user interface, data and data access, database connectivity, cryptography, web application development, numeric algorithms, and network communications. The class library may be used by programmers, who combine it with their own code to produce applications. Some programs written for the .NET Framework execute in a software environment that manages the program's runtime requirements. This runtime environment is known as the Common Language Runtime (CLR). The CLR provides the appearance of an application virtual machine so that programmers need not consider the capabilities of the specific CPU that will execute the program. The CLR also assists with other important services such as security, memory management, and exception handling. The class library and the CLR together comprise the .NET Framework.

The core aspects of the .NET Framework lie within the Common Language Infrastructure, or CLI. The purpose of the CLI is to provide a language-neutral platform for application development and execution, including functions for exception handling, garbage collection, security, and interoperability. Microsoft's implementation of the CLI is called the CLR. It provides classes to build distributed applications, as well as network services that send messages over channels. The .NET Framework includes remoting in the CLR. A .NET program can run on any platform the .NET Framework resides on. .NET languages comprise Visual Basic .NET (VB.NET) and C#. Visual Basic .NET is a language based off Visual Basic 6.0, allowing relatively easy porting of Visual Basic code to .NET. C# (pronounced C-Sharp), is another language based off C, C++, and Java. ASP.NET may also be implemented in some embodiments to among other things assist with web page or interface postbacks and caching. Also, ADO.NET may be utilized to assist communication with the database and/or databases. With ADO.NET once information has been requested, the client disconnects from the server while processing the information. Then, the client reconnects to the server to deliver any changes to the data to the server.

The intermediate CIL code may housed in .NET assemblies. As directed by specification, assemblies are stored in the Portable Executable (PE) format, common on the Windows platform for DLL and EXE files. The assembly may consist of one or more files, one of which generally contains the manifest, which has the metadata for the assembly. The complete name of an assembly contains its simple text name, version number, culture, and public key token. The public key token is a unique hash generated when the assembly is compiled, thus two assemblies with the same public key token are guaranteed to be identical from the point of view of the framework. A private key can also be specified known only to the creator of the assembly and can be used for strong naming and to guarantee that the assembly is from the same author when a new version of the assembly is compiled (required addition of an assembly to the Global Assembly Cache).

CLI may be self-describing through .NET metadata. The CLR checks the metadata to verify the correct method is called. Metadata is usually generated by language compilers but developers can create their own metadata through custom attributes. Metadata contains information about the assembly, and is also used to implement the reflective programming capabilities of .NET Framework.

.NET has its own security mechanism with two general features: Code Access Security (CAS), and validation and verification. Code Access Security is based on evidence that is associated with a specific assembly. Typically the evidence is the source of the assembly (whether it is installed on the local machine or has been downloaded from the intranet or Internet). Code Access Security uses evidence to determine the permissions granted to the code. Other code can demand that calling code is granted a specified permission. The demand causes the CLR to perform a call stack walk: every assembly of each method in the call stack is checked for the required permission; if any assembly is not granted the permission a security exception is thrown.

When an assembly is loaded the CLR performs various tests. Two such tests are validation and verification. During validation the CLR checks that the assembly contains valid metadata and CIL, and whether the internal tables are correct. The verification mechanism checks to see if the code does anything that is 'unsafe'. Unsafe code will only be executed if the assembly has the 'skip verification' permission, which generally means code that is installed on the local machine.

.NET Framework uses appdomains as a mechanism for isolating code running in a process. Appdomains can be created and code loaded into or unloaded from them independent of other appdomains. This helps increase the fault tolerance of the application, as faults or crashes in one appdomain do not affect rest of the application. Appdomains can also be configured independently with different security privileges. This can help increase the security of the application by isolating potentially unsafe code. The developer, however, has to split the application into subdomains; it is not done by the CLR.

The .NET Framework includes a set of standard class libraries. The class library is organized in a hierarchy of namespaces. Most of the built in APIs are part of either System or Microsoft namespaces. These class libraries implement a large number of common functions, such as file reading and writing, graphic rendering, database interaction, and XML document manipulation, among others. The .NET class libraries are available to all .NET languages. The .NET Framework class library is divided into two parts: the Base Class Library and the Framework Class Library.

The Base Class Library (BCL) includes a small subset of the entire class library and is the core set of classes that serve as the basic API of the Common Language Runtime. The classes in mscorlib.dll and some of the classes in System.dll and System.core.dll are considered to be a part of the BCL. The BCL classes are available in both .NET Framework as well as its alternative implementations including .NET Compact Framework, Microsoft Silverlight and Mono.

The Framework Class Library (FCL) is a superset of the BCL classes and refers to the entire class library that ships with .NET Framework. It includes an expanded set of libraries, including WinForms, ADO.NET, ASP.NET, Language Integrated Query, Windows Presentation Foundation, Windows Communication Foundation among others. The FCL is much larger in scope than standard libraries for languages like C++, and comparable in scope to the standard libraries of Java.

The .NET Framework CLR frees the developer from the burden of managing memory (allocating and freeing up when done); instead it does the memory management itself. To this end, the memory allocated to instantiations of .NET types (objects) is done contiguously from the managed heap, a pool of memory managed by the CLR. As long as there exists a reference to an object, which might be either a direct reference to an object or via a graph of objects, the object is considered to be in use by the CLR. When there is no reference to an object, and it cannot be reached or used, it becomes garbage. However, it still holds on to the memory allocated to it. .NET Framework includes a garbage collector which runs periodically, on a separate thread from the application's thread, that enumerates all the unusable objects and reclaims the memory allocated to them.

The .NET Garbage Collector (GC) is a non-deterministic, compacting, mark-and-sweep garbage collector. The GC runs only when a certain amount of memory has been used or there is enough pressure for memory on the system. Since it is not guaranteed when the conditions to reclaim memory are reached, the GC runs are non-deterministic. Each .NET application has a set of roots, which are pointers to objects on the managed heap (managed objects). These include references to static objects and objects defined as local variables or method parameters currently in scope, as well as objects referred to by CPU registers. When the GC runs, it pauses the application, and for each object referred to in the root, it recursively enumerates all the objects reachable from the root objects and marks them as reachable. It uses .NET metadata and reflection to discover the objects encapsulated by an object, and then recursively walk them. It then enumerates all the objects on the heap (which were initially allocated contiguously) using reflection. All objects not marked as reachable are garbage. This is the mark phase. Since the memory held by garbage is not of any consequence, it is considered free space. However, this leaves chunks of free space between objects which were initially contiguous. The objects are then compacted together, by using memory to copy them over to the free space to make them contiguous again. Any reference to an object invalidated by moving the object is updated to reflect the new location by the GC. The application is resumed after the garbage collection is over.

The GC used by .NET Framework is actually generational. Objects are assigned a generation; newly created objects belong to Generation 0. The objects that survive a garbage collection are tagged as Generation 1, and the Generation 1 objects that survive another collection are Generation 2 objects. The .NET Framework uses up to Generation 2 objects. Higher generation objects are garbage collected less frequently than lower generation objects. This helps increase the efficiency of garbage collection, as older objects tend to have a larger lifetime than newer objects. Thus, by removing older (and thus more likely to survive a collection) objects from the scope of a collection run, fewer objects need to be checked and compacted.

Figure 6:
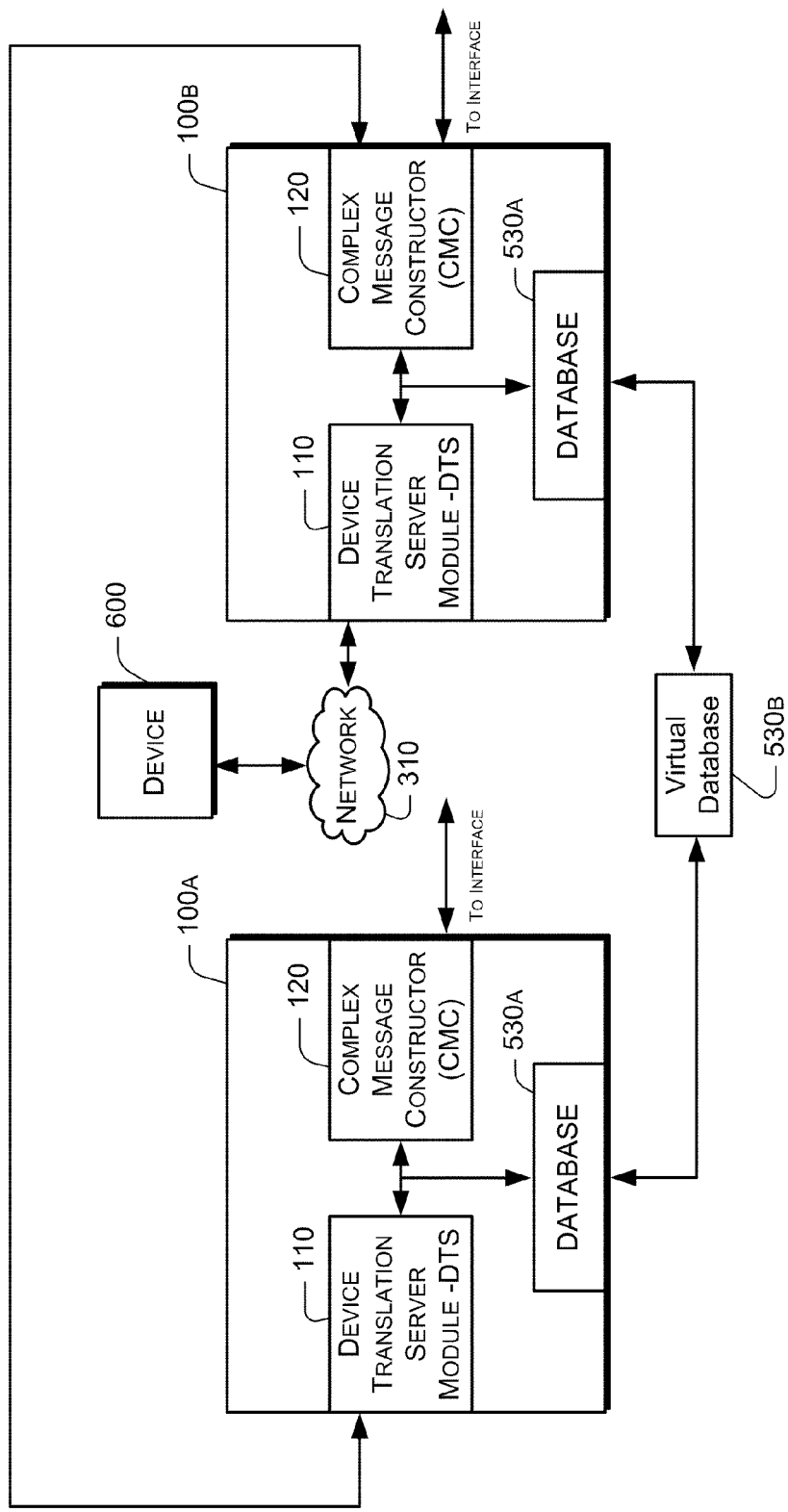
FIG. 6 shows a diagram illustrating an embodiment of a suite of software components configured to provide a network of networks for machine-to-machine network connectivity.
Figure 7:
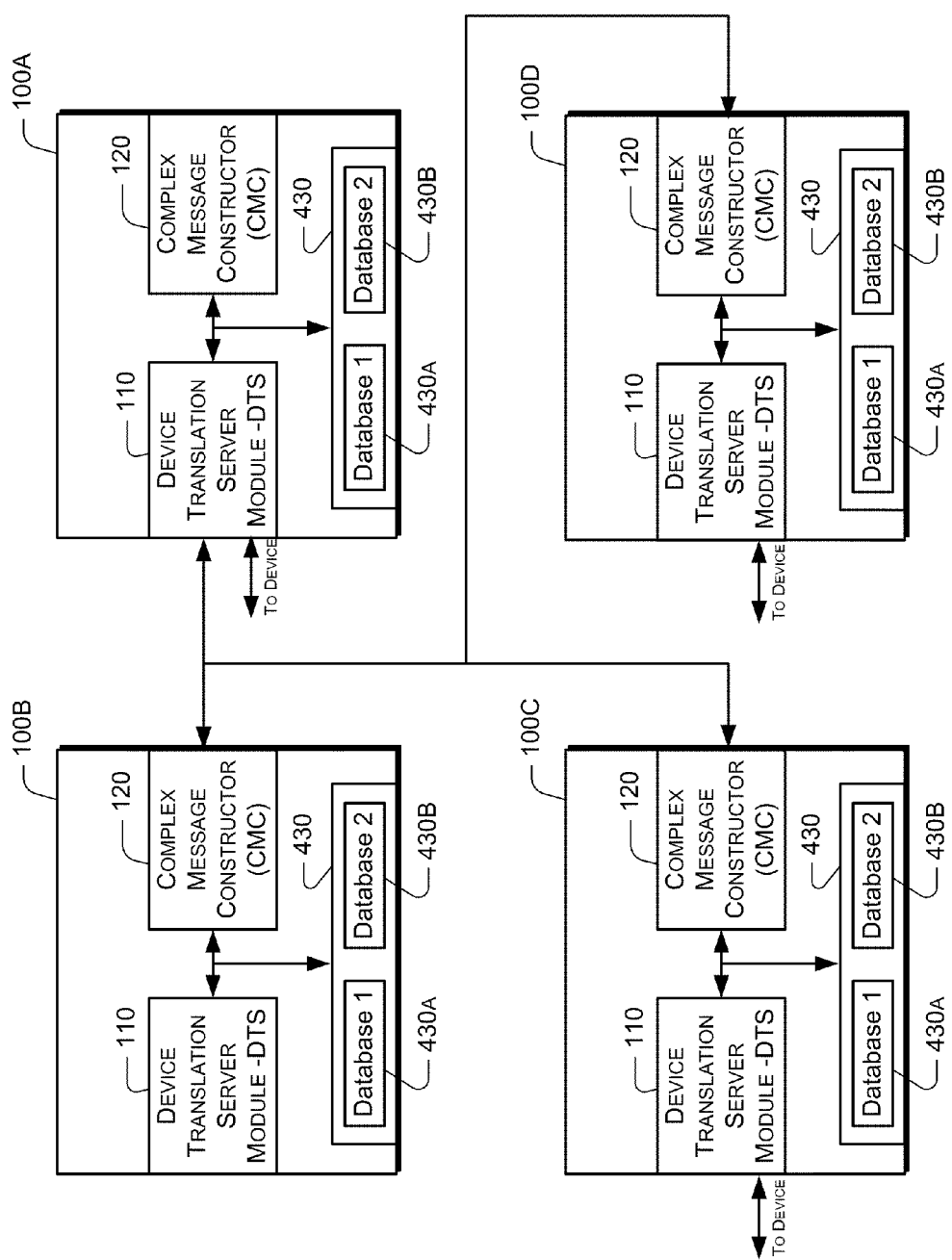
FIG. 7 provides another diagram illustrating an embodiment of a suite of software components configured to provide a network of networks for machine-to-machine network connectivity.

As shown in FIGS. 6 and 7, a network of networks of software suites can be created by linking the DTS's and CMC's of more than one suite of software suites (100A, 100B); and virtual databases 530B may be shared by multiple software suite instances. For example, in environments with security concerns and multiple distributed locations such as corporations with multiple offices the format shown in FIG. 7 may be implemented. In this embodiment, the DTS of suite of software components 100A is coupled to the CMCs of suite of software components 100B, 100C, and 100D. This facilitates the suite of software components 100A can control, query, and save information on the devices coupled to suite of software components 100B, 100C, and 100D. The illustrated system configuration can be scaled up or down as needed by adding or subtracting additional suite of software components. Or, an implementation of an additional suite of software components may be added for quick scalability of a replicated system.

Figure 8:
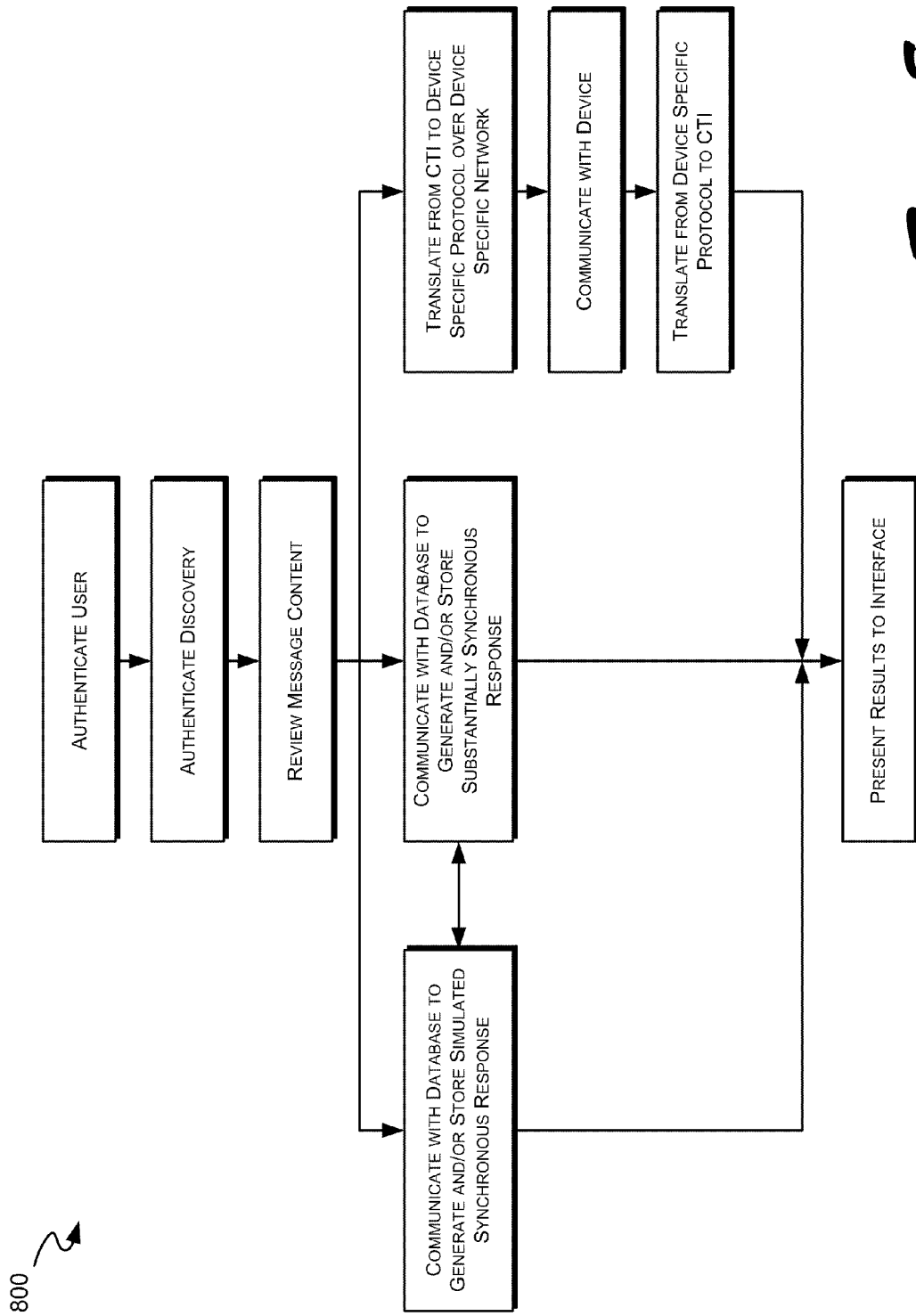
FIG. 8 illustrates a flow chart showing a method for an interface initiated request to a system configured to provide machine-to-machine network connectivity.

FIG. 8 depicts a flow chart 800 illustrating a method for an interface-initiated system configured to provide machine-to-machine network connectivity, where a request is sent through an interface. This request may be for data, for device initiation or control, status, and or any other appropriate query of a device. The CMC will authenticate the permission and security of the user accessing the system as set out by a predetermined security protocol or access control list (ACL). The CMC will also verify the user access level within the system. Additionally, if desired, the CMC will review the content of the message request for any additional routing or action needed. The CMC will query the database and/or prepare the request for communication with the device. If the user requests data from the database, the data will the queried, and a reply will be delivered to the interface. If requesting substantially real-time device information, the request will be translated into the correct device and/or devices specific protocol and delivered over the proper network or networks for the device and/or devices. Preprogrammed economics, delivery success, and speed of transfer may be evaluated to determine which network to utilize if multiple networks are available for the device and/or devices. The information requested may be stored in the database and provided to the interface. If the information requested from the database and/or device is for substantially real-time data and substantially real-time data is unavailable simulated synchronous information will be delivered to the user.

Figure 9A:
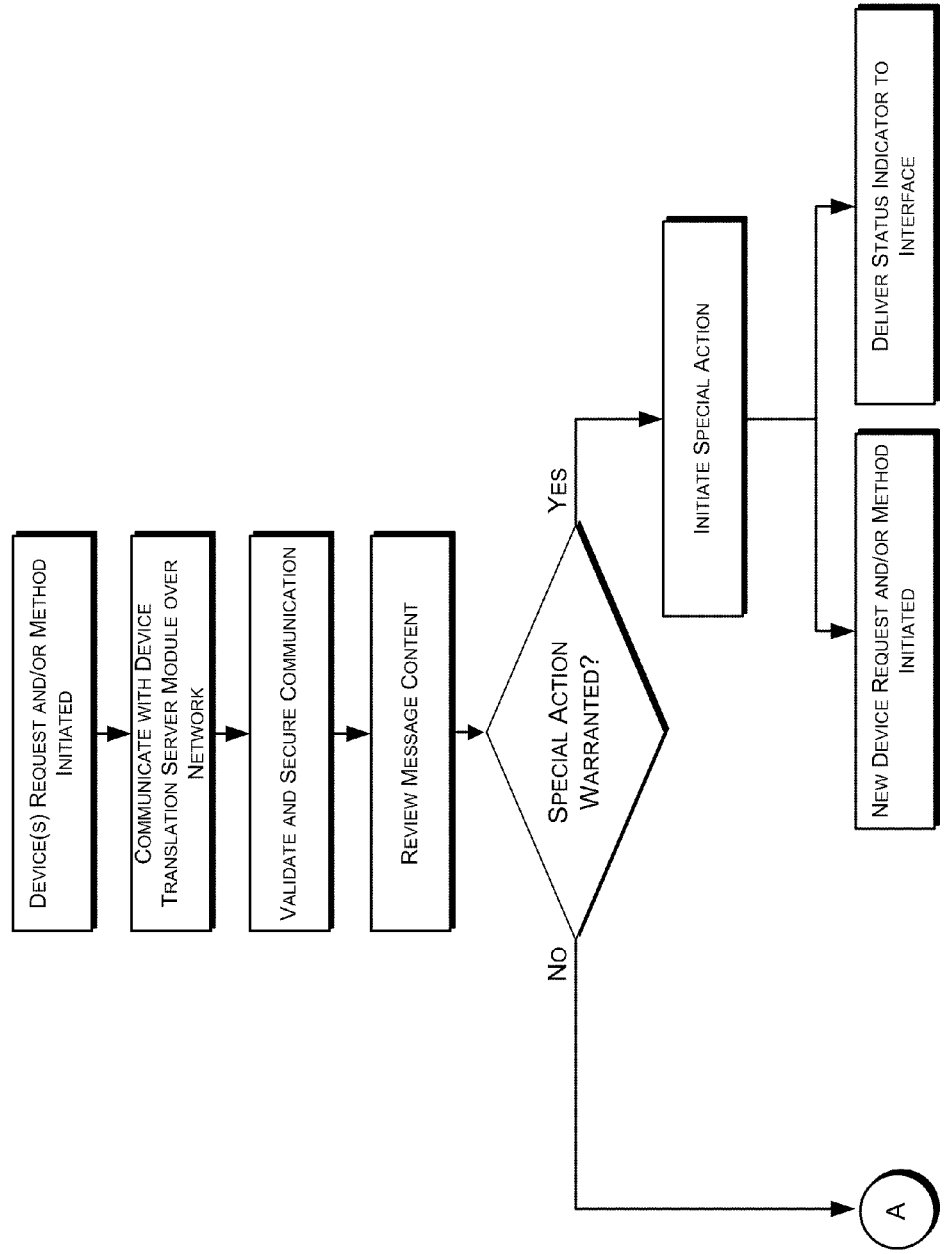
FIGS. 9A and 9B represent a flow chart illustrating another method for a device initiated request to a system configured to provide machine-to-machine network connectivity.
Figure 9B:
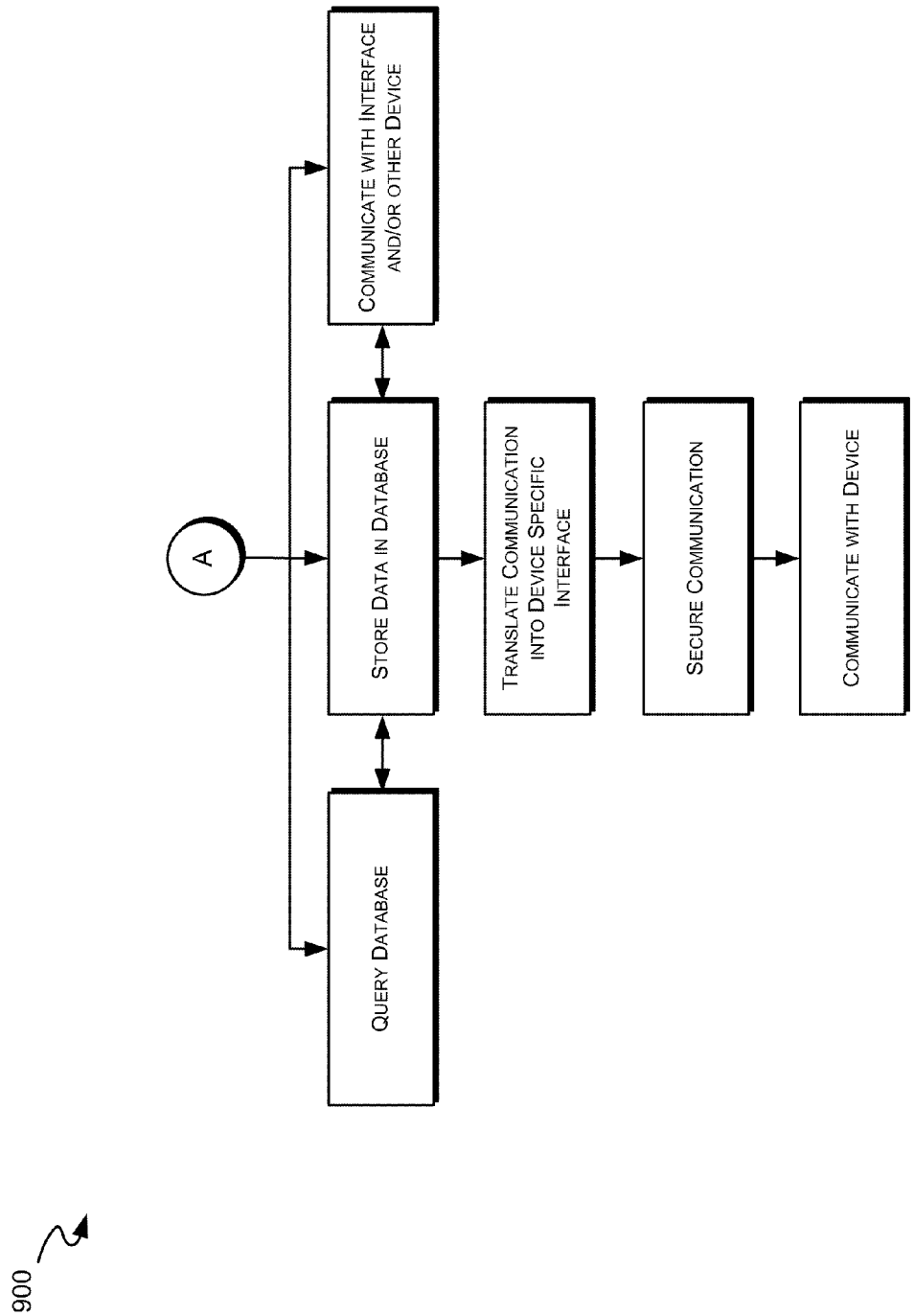

FIGS. 9A-9B depict a flow chart 900 illustrating another method for a device initiated request to a system configured to provide machine-to-machine network connectivity. In this embodiment, a device initiates a request and/or method to the system. The device sends its request in a device specific protocol over the device specific network to the DTS. The DTS in concert with the CMC validates and secures the communication. The DTS translates the request and/or method into the CTI. The method or request stores data in the database, retrieves data from the database, communicates with the interface and/or an additional device. The data is translated into the device specific protocol over the device specific network. Preprogrammed economics, delivery success, and speed of transfer shall be evaluated and determine which network with which to communicate if multiple networks are available for the device and/or devices.

In one embodiment, a specific implementation of the system may include a user in a company wishes to determine the whereabouts of his fleet of vehicles equipped with location device and operating data devices. The user may utilize a preprogrammed graphical user interface such as a web interface to query the historical location of vehicles 1, 4, and 13, of his 20 vehicle fleet. Using the system configured to provide machine-to-machine network connectivity the user may select the appropriate dropdowns, enters the information from a set interval, and/or toggles the interactive GUI to format the request as desired. The request is checked for security authorization and user permissions by the CMC. Once the request is validated that the user has the appropriate permission for device discovery and the messages is sufficiently secured the CMC queries the database such as the system data facility for the historical stored data that has been automatically requested from by system configured to provide machine-to-machine network connectivity at set periods. The historical location data is retrieved and sent to the interface where it is organized and displayed as a map depicting the trails of the vehicles in individual colors. Next, the user may request the current location of vehicles 2 and 3. The request is checked for security authorization and user permissions by the CMC. Once the request is validated that the user has the appropriate permission for device discovery and the messages are sufficiently secured the CMC communicates with the DTS to translate the CTI request to a device specific protocol and device specific network. Vehicle 2 and vehicle 3 may be both equipped with telemetry location devices of a different make and model. The substantially real-time information on vehicle 2 may be available while the substantially real-time location information for vehicle 3 may be currently unavailable. The DTS will translate the retrieved information for vehicle 2 into CTI and store it in the database. The CMC will send substantially synchronous information to the interlace for vehicle 2 and simulated synchronous location information for vehicle 3 indicating time that the data was last verified current.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well. Therefore, the present invention should not be seen as limited to the forms shown, which is to be considered illustrative rater than restrictive.

What is claimed is:

1. A method of machine-to-machine communication comprising:
   authenticating a source of an issued command;
   performing device discovery according to the authenticated source of the issued command;
   reviewing a content of the issued command and comparing the content of the issued command with a preset programming;
   generating notifications based on a comparison of the preset programming and both stored device reporting information and synchronous device reporting information, wherein the preset programming comprises at least one of a determination of reported data trends, device status, device communication failure, device operating in an unauthorized manner, reported level deviating from an expected range, and reported data exceeding a safety condition;
   querying, storing and retrieving information from a database based on the comparison;
   translating a common telemetry interface to a device specific protocol;
   executing a device method instance in real-time, wherein the device method instance comprises at least one of a device specific protocol information, device specific location information, device identifier, and device specific network information;
   executing a method in simulated synchronously if real-time data is unavailable;
   translating from the device specific protocol to the common telemetry interface; and
   storing and replying to the source of the issued command.

2. The method of machine-to-machine communication of claim 1, wherein the issued command is issued by a user on a web application interface.

3. The method of machine-to-machine communication of claim 1, wherein unique device method instances are configured on device specific device translation server module stored on a database.

4. The method of machine-to-machine communication of claim 3, wherein the database is a virtual database.

5. The method of machine-to-machine-communication of claim 1, wherein the issued command is issued by a preset condition.

6. The method of machine-to-machine communication of claim 1, wherein the issued command is issued by a device.

7. The method of machine-to-machine communication of claim 1, wherein authenticating an issued command comprises one or more of credential verification, certificate matching, authentication, discovery, verifying encapsulated data, verifying private data wrapped in classes in object-oriented programming languages, verifying protocol layering and verifying message encryption.

8. The method of machine-to-machine communication of claim 1, wherein executing a method in real-time if desired is based on network optimization factors.

9. The method of machine-to-machine communication of claim 8; wherein the network optimization factors comprise at least one of the following a determination of network availability, a determination of backup network availability, a determination of expected network data transfer duration and a determination of expected backup network data transfer duration.

10. The method of machine-to-machine communication of claim 1, wherein the device configured to send remote reporting information in the device specific protocol on the device specific network to the device translation server module is passive.

11. The method of machine-to-machine communication of claim 1, wherein a user can set an escalating notification preference.

12. The method of machine-to-machine communication of claim 1, wherein the device specific networks comprises one or more of Skytel, USAM, Wyless, Sprint, Private LAN, T-Mobile, AT&T, Private VPN, ReFLEX or Mobitex, WCTP, and Private WAN.

13. The method of machine-to-machine communication of claim 1, wherein the device specific protocol information comprises one or more of XML, SOAP over HTTP, WSDL, UDDI, SMTP, binary encoding over TCP, ReFlex, GPRS, EDGE, Mobitex, CDMA, EVDO, VSAT, wired LAN, wired WAN, message queues via Microsoft Windows MSMQ.

14. A method of machine-to-machine communication comprising:
   authenticating a source of an issued command;
   performing device discovery according to the authenticated source of the issued command;
   reviewing a content of the issued command and comparing the content of the issued command with a preset programming;
   generating notifications based on a comparison of the preset programming and both stored device reporting information and synchronous device reporting information, wherein the preset programming comprises at least one of a determination of reported data trends, device status, device communication failure, device operating in an unauthorized manner, reported level deviating from an expected range, and reported data exceeding a safety condition;
   querying, storing and retrieving information from a database based on the comparison, the database virtually linked between multiple instances of a suite of software components;
   translating a common telemetry interface to a device specific protocol;
   executing a device method instance in real-time, wherein the device method instance comprises at least one of a device specific protocol information, device specific location information, device identifier, and device specific network information;
   executing a method in simulated synchronously if real-time data is unavailable;
   translating from the device specific protocol to the common telemetry interface; and
   storing and replying to the source of the issued command.

15. The method of machine-to-machine communication claim 14, wherein the issued command is issued by a user on a web application interface.

16. The method of machine-to-machine communication of claim 14, wherein unique device method instances are configured on device specific device translation server module stored on a database.

17. The method of machine-to-machine communication of claim 16, wherein the database is a virtual database.

18. The method of machine-to-machine communication of claim 14, wherein the issued command is issued by one of a preset condition and a device.

* * * * *